(12) United States Patent
Miyahara et al.

(10) Patent No.: US 6,234,517 B1
(45) Date of Patent: May 22, 2001

(54) AIR BAG APPARATUS FOR A VEHICLE

(75) Inventors: Takehiko Miyahara; Masanori Narita; Kiyoharu Ishigouoka; Yoshihiro Koga, all of Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/444,712

(22) Filed: Nov. 24, 1999

(30) Foreign Application Priority Data

Nov. 27, 1998 (JP) .................................................. 10-337781

(51) Int. Cl.⁷ .................................................. B60R 21/22
(52) U.S. Cl. ........................................ 280/730.2; 280/751
(58) Field of Search ............................. 280/730.2, 730.1, 280/751, 728.3

(56) References Cited

U.S. PATENT DOCUMENTS

| | | | | |
|---|---|---|---|---|
| 5,884,937 | * | 3/1999 | Yamada | 280/730.2 |
| 5,899,486 | * | 5/1999 | Ibe | 280/730.2 |
| 5,988,673 | * | 11/1999 | Stavermann | 280/730.1 |
| 6,079,732 | * | 6/2000 | Nakajima et al. | 280/730.2 |
| 6,102,435 | * | 8/2000 | Wallner et al. | 280/730.2 |

FOREIGN PATENT DOCUMENTS

| | | | |
|---|---|---|---|
| 196 12 227 | * | 10/1997 | (DE) . |
| 9-156450 | | 6/1997 | (JP) . |
| 9-207701 | | 8/1997 | (JP) . |
| 10-138861 | | 5/1998 | (JP) . |
| 10-181512 | | 7/1998 | (JP) . |

* cited by examiner

*Primary Examiner*—Peter C. English
(74) *Attorney, Agent, or Firm*—McDermott, Will & Emery

(57) ABSTRACT

An air bag apparatus for a vehicle has a longitudinal pad, a longitudinal metal cover, and an air bag that is folded-up. The pad is fixed within a roof rail, and has a cross-section that is substantially the shape of a hat that protrudes into the passenger compartment of the vehicle. The cover is disposed beneath the pad on the inner surface of the roof rail, has an upper end that is fixed to the uppermost surface of the pad, a lower end that is in proximity to the roof rail, and a substantially L-shaped cross-section. The air bag is housed between the roof rail and the cover and, when the vehicle experiences a collision, pushes outward between the lower end of the cover and the roof rail, so as to form an aperture therebetween, from which the air bag deploys downward.

17 Claims, 5 Drawing Sheets

AIR BAG APPARATUS FOR A VEHICLE

The content of Application No. TOKUGANHEI 10-337781 which was filed in Japan on Nov. 27, 1998 and on which the claim to priority for this application is based, is hereby incorporated by reference.

BACKGROUND OF THE INVENTION

The present invention relates to air bag apparatus for a vehicle.

The body of an automobile has a roof rail in proximity to the head of a passenger, and a pad with a cross-sectional shape of a hat provided on the roof rail. When a side collision or the like occurs, if a passenger's head comes into contact with this pad, deformation of the pad absorbs the energy of the collision with the head, thereby protecting the head of the passenger.

Recently, there have been cases in which an air bag is disposed on the roof rail as protection in the case of a side collision, and technology related to this is disclosed in Japanese laid-open patent application publication H9-156450. In an air bag apparatus of this type, a folded-up air bag is disposed in proximity to the roof rail, this air bag expanding downward so as to protect the head of a passenger in the case of a side collision.

SUMMARY OF THE INVENTION

With the above-noted structure, because it is necessary to position both the air bag apparatus and the pad above at a position on the roof rail that is near the passenger's head, is difficult to locate both of these elements, because of space restrictions, in a manner that prevents loss of the functionality thereof.

Accordingly, it is an object of the present invention to provide an air bag apparatus that, in addition to the function of the air bag, also enables the pad to serve in a protective role.

To achieve the above-noted object, an air bag apparatus according to the present invention has a member for absorbing energy in the longitudinal direction fixed onto an inner surface of a roof rail, a longitudinal metal cover disposed below the energy-absorbing member on the inner surface of the roof rail, and an air bag folded up and housed in an inner space defined between the roof rail and the cover. The energy-absorbing member has a cross-section that is substantially that of a hat having a base portion attached to a roof rail inner part and a top portion protruding into the passenger compartment of the vehicle. The cover has an upper end that is fixed to an uppermost surface of the energy-absorbing member top portion and a lower end that is in proximity to the roof rail. When the air bag is inflated upon the occurrence of a collision of the vehicle, the air bag expands so as to form an aperture that widens, by pressing between the lower end of the cover and the roof rail, thereby expanding downward to the outside of this aperture through the aperture.

According to the above-noted structure, because the upper end of the cover is fixed to the uppermost surface of the energy-absorbing member, when the air bag expands within the cover due to a side collision of the vehicle, the air bag applies pressure between so as to open up an aperture between the lower end of the cover and the roof rail, thereby expanding downward to the outside of the aperture so as to protect the head of a passenger.

In the case in which the side collision is not of a degree that would cause the air bag to expand, the energy-absorbing member and the metal cover deform, thereby serving to absorb the collision energy to which the passenger's head is subjected. For this reason, it is possible to sufficiently absorb the energy of collision.

Thus, even using a small energy-absorbing member, it is possible to achieve both the energy-absorbing function of the air bag and the energy-absorbing function of the energy-absorbing member, thereby providing energy absorption that is appropriate to the strength of the side collision.

DESCRIPTION OF THE PREFERRED EMBODIMENTS

Preferred embodiments of the present invention are described below in detail, with reference being made to relevant accompanying drawings.

Figure 1:
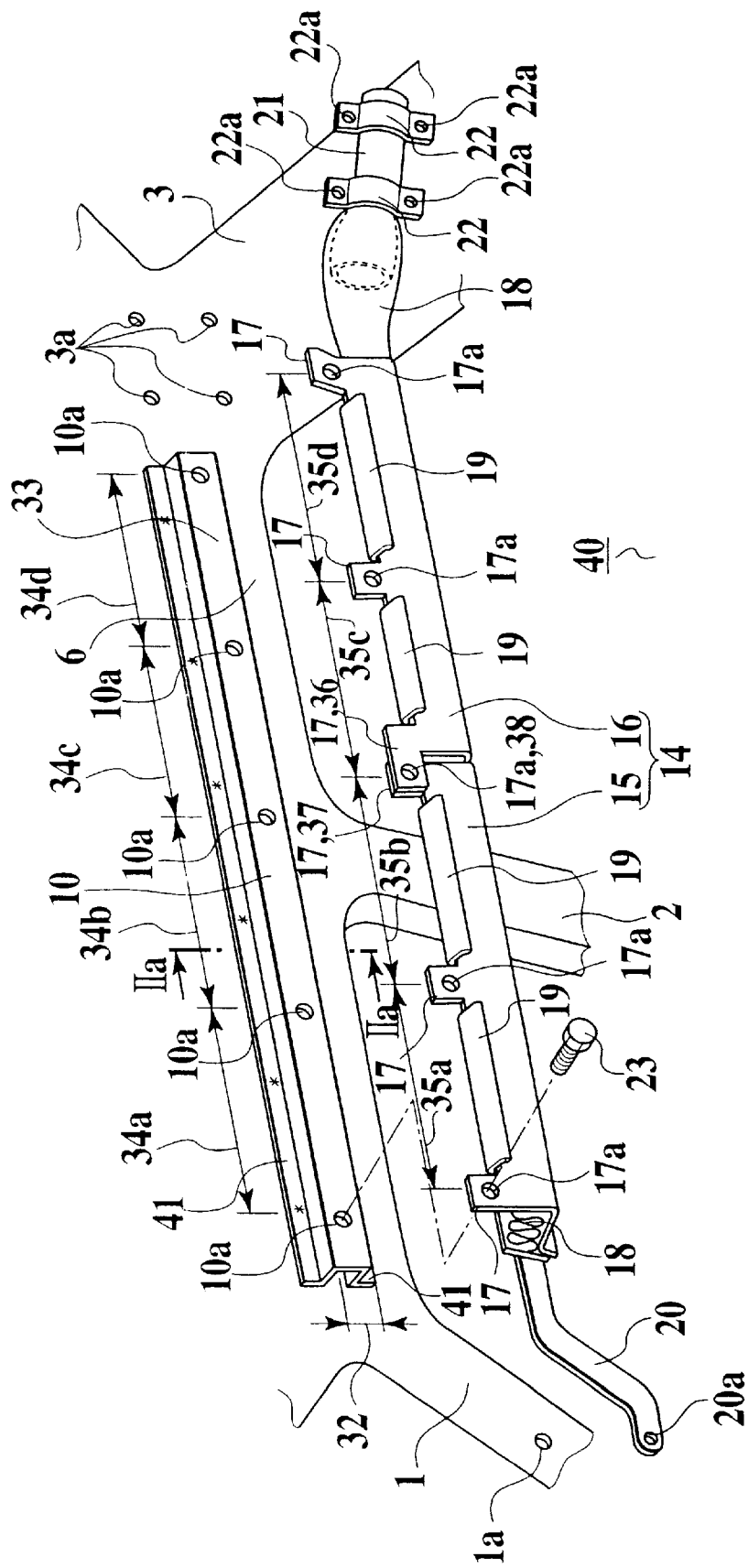
FIG. 1 is an exploded perspective view of the first embodiment of the present invention.
Figure 2:
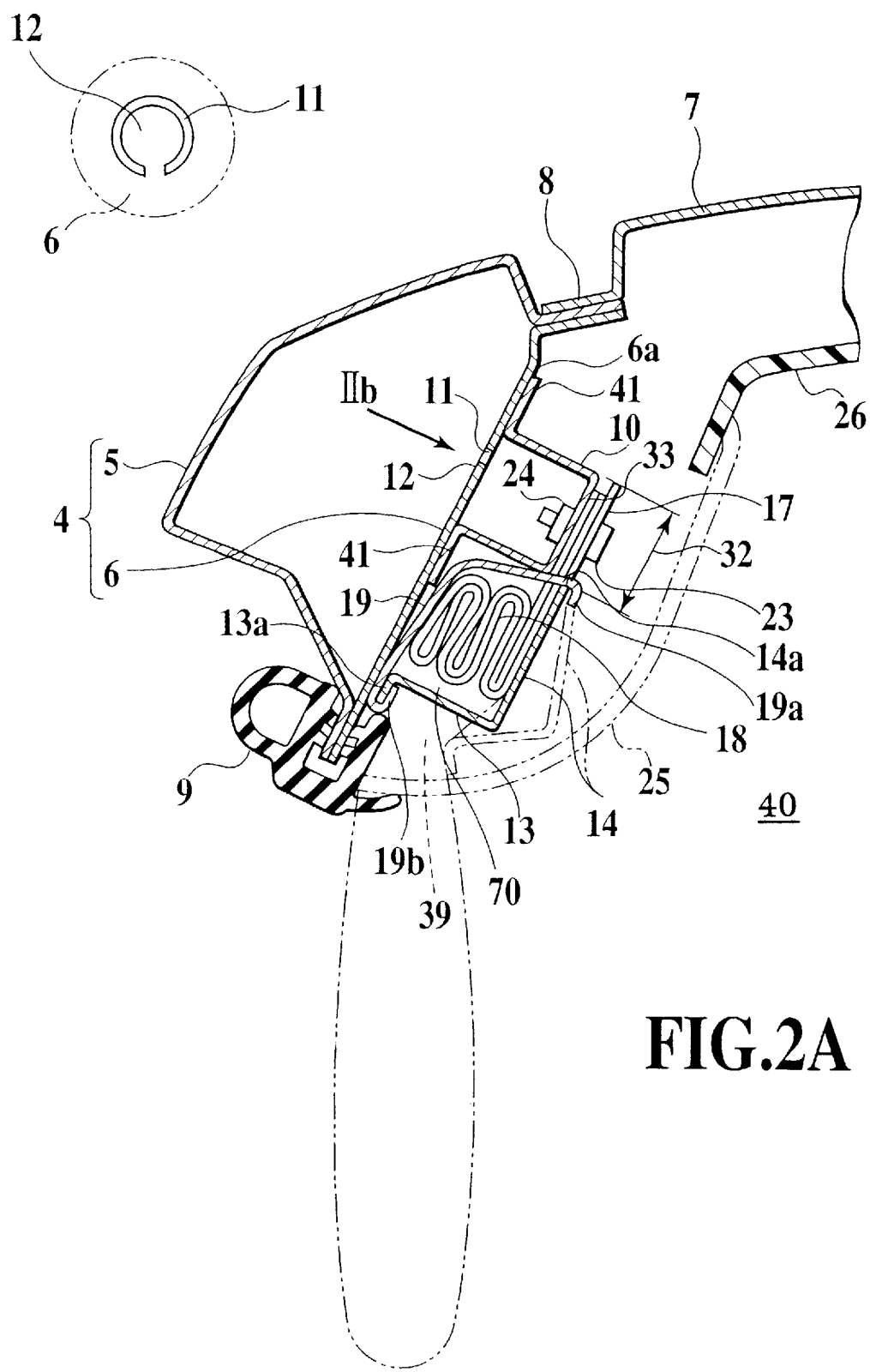
FIG. 2A is a cross-section view in the direction of the arrows IIa—IIa shown in FIG. 1.
FIG. 2B is an enlarged plan view in the direction of the arrow IIb in FIG. 2A.

FIG. 1, FIG. 2A, and FIG. 2B show the first embodiment of the present invention. FIG. 1 is a perspective view of the upper part of a vehicle as seen from the passenger compartment 40 thereof, and FIG. 2A is a cross-section view in the direction of the arrows IIa—IIa shown in FIG. 1.

As shown in FIG. 1 and FIG. 2A, the upper ends of a front pillar 1, a center pillar 2, and a rear pillar 3 are joined by a roof rail 4 extending in the front-to-back direction of the vehicle. The roof rail 4 has a closed cross-section and is formed by a roof rail outer part 5 and a roof rail inner part 6. The upper end of the roof rail 4 is joined to the end of the roof panel 7, the joint between these two elements forming a roof drip 8 for the purpose of water runoff. A weather strip 9 for the purpose of ensuring watertightness with a door (not shown in the drawing) is mounted to the lower end of the roof rail 4.

The surface 6a of the roof rail inner part 6 (inner surface of the roof rail 4) has welded to it a double flange part 41 of a metal pad 10 (energy-absorbing member) that has a hat-shaped cross-section. The width 32 of the pad 10 is established so as to be small, so as to establish an inner space 70 for housing the air bag 18 to be described below.

Mounting holes 10a, at spacings of 34a, 34b, 34c, and 34d, are formed in the uppermost surface 33 of the pad 10. A nut 24 into which a bolt 23 is received for mounting the cover 14, to be described below, is welded to the rear surface each of the mounting holes 10a, the bolts 23 and nuts constituting fastening members.

Deformable regions 12 are formed by arc-shaped slits 11 formed in the roof rail inner part 6 so as to be incomplete circuits with a part remaining at the bottom, the position of which correspond to the position of the bolts 23 (refer to FIG. 2B). When pressed by the bolts 23 or nuts 24, the deformable regions 12 are pressed into the inside of the roof rail 4, thereby allowing the bolts 23 or nuts 24 to be moved to inside the roof rail 4.

A cover 14 having a substantially L-shaped cross-section is disposed below the pad 10. The cover 14 is formed by a front cover 15 and a rear cover 16, the rear end of the front cover 15 and the front end of the rear cover 16 being linked in a position in proximity to the upper part of the center pillar 2. Mounting tabs 17 extend from the front and rear end of the covers 15 and 16 and from the upper center thereof. Mounting holes 17a corresponding to the positions of the mounting holes 10a are formed in these mounting tabs 17. That is, the spacings 35a, 35b, 35c, and 35d of the mounting holes 17a in the mounting tabs 17 are established so as to be the same as the spacings 34a, 34b, 34c, and 34d of the mounting holes 10a of the pad 10. Additionally, the spacings 34a, 34b, 34c, and 34d are established so that the flexure of the cover 14 when the air bag 18 expands is within a prescribed limit.

Mounting holes 17a and 38 are formed in a part in which the mounting tab 36 at the front edge of the rear cover 16 is bent forward so as to overlap with the mounting tab 37 at the rear edge of the front cover 15. The cover 14 and the pad 10 have the same deformed shape, and have substantially the same shock-energy absorbing characteristics. By making the sheet thickness, the material, and the cross-section shape of the cover 14 and the pad 10 substantially the same, the shock energy absorption characteristics are established as being substantially the same.

A folded-up air bag 18 is housed in the space 70 defined between the roof rail inner part 6 and the cover 14. The inner side of the air bag 18 is engaged with the cover 14, and the outer side of the air bag 18 is supported by tie backs 19. The upper edge 19a of each tieback 19 is engaged with the upper edge 14a of the cover 14, and the lower edges 19b of the tiebacks 19 are engaged with the lower wall 13 of the cover 14. For this reason, the tiebacks 19 can be easily removed from the cover 14. A supporting piece 20, which extends downward at an inclination along the front pillar 1 is formed at the front end of the tiebacks 19, the end of the supporting piece 20 and the front pillar 1 opposite this front end having formed in them mounting holes 1a and 20a, respectively.

The rear end of the air bag 18 is exposed to the rear from the cover 14, and is connected to an inflator 21 which generates a gas for the purpose of inflating the air bag 18. A front and rear pair of brackets 22 is mounted to the inflator 21. Mounting holes 22a are formed at the upper and lower ends of the brackets 22, and mounting holes 3a are formed in the rear pillar 3 at positions corresponding to these mounting holes 3a.

The process of mounting the cover 14, the air bag 18 and other elements to the roof rail inner part 6 is performed as follows.

A pad 10 is pre-welded to the roof rail 6, the air bag 18 that is folded up inside the cover 14 is supported by the tiebacks 19. The rear end of the air bag 18 is connected to the inflator 21.

First, the cover 14 and the air bag 18 are placed within the passenger compartment 40. When this is done, because the cover 14 is divided between the front and rear covers 15 and 16, it is easy to place them within the passenger compartment 40. After placing the cover 14 and the air bag 18 within the passenger compartment 40, the mounting holes 17a of the mounting tabs 17 are positioned so as to be opposite the mounting holes 10a, of the pad 10, and the bolts 23 are inserted into the mounting holes 17a and 10a and tightened into the nuts 24 that are welded to the pad 10, thereby fixing the mounting tabs 17 to the uppermost surface 33 within the pad 10. The overlapped mounting tabs 36 and 37 are fixed in the same manner as the mounting tabs 17a, so that the front and rear covers 15 and 16 are linked via the mounting tabs 36 and 37. Because the mounting tabs 36 and 37 are tightened in place by a single bolt, there is only one bolt required, thereby improving work efficiency. The supporting piece 20 of the tieback 19 is tightened in place to the center pillar 1 by means of a bolt (not shown in the drawing), which passes through a nut (not shown in the drawing) and the mounting holes 1a and 20a.

By mounting the cover 14 in the above-noted manner, the air bag 18 is substantially housed in the space 70 between the roof rail inner part 6 and the cover 14. Although the lower wall 13 of the cover 14 is not fixed to the roof rail inner part 6, the rigidity of the cover 14 itself maintains its proximity to the roof rail inner part 6.

Next, the inflator 21 is connected to the rear end of the air bag 18, and bolts and nuts (not shown in the drawing) are used to tighten the mounting holes 22a of the brackets 22 and the mounting holes 3a of the center pillar 3. After mounting the cover 14 and the air bag 18 and other elements to the roof rail inner part 6 in this manner, the inner-facing side of the cover 14 is covered by the garnishing 25 and the roof trim 26.

The action of the first embodiment of the present invention is as follows.

First, when a side collision of the vehicle is sensed by a sensor (not shown in the drawing), gas is injected into the air bag 18 from the inflator 21, causing the start of bag inflation. The cover 14 is fixed only at its upper end to the mounting tabs 17, and is not fixed at its lower wall 13. For this reason, when the air bag 18 expands, the cover 14 is pushed upward, so that it opens about the mounting tabs 17 which serve as hinges, the result being that that the end 13a of the lower wall 13 is released from the lower ends 19b of the tiebacks 19 and away from the roof rail inner part 6, so that an aperture 39 is formed between the lower wall 13 and the roof rail inner part 6. The air bag 18 then extends downward through the aperture 39 in a curtain-like manner, so as to protect the head of the passenger. The spacings 34a, 34b, 34c, and 34d of the mounting holes 10a, of the pad 10 are established so that the flexure of the cover 14 remain within a prescribed limit when the air bag 18 expands. The cover 14 is pushed upward by the air bag 18 upon expansion of the air bag 18, so as to form an aperture 39 of sufficient size to permit good deployment of air bag 18 downward.

Because the shock energy absorption characteristics of the pad 10 and the cover 14 are substantially the same, in the case in which a side collision is not of a degree that would cause the air bag 18 to deploy, the head of the passenger comes into contact with the pad 10 and the cover 14, so that the shock energy to which the head is subjected is absorbed by the pad 10 and the cover 14. Thus, the cover 14 and the pad 10 have equivalent functions, and act in concert to absorb the shock energy. Because the cover 14 has a function that is equivalent to that of the pad 10, the reduction in energy absorption amount by the pad 10 caused by making the width 32 thereof small is compensated for by the energy absorption by the cover 14, so that there is sufficient overall energy absorption. Therefore, it is possible even using a small pad 10 to achieve both energy absorption by the air bag 18 and energy absorption by the deformation of the material of the pad 10 and the cover 14, making it possible to provide energy absorption that is appropriate to the strength of the side collision. The shock energy absorption characteristics of the combination of the pad 10 and the cover 14 can be easily adjusted, by selecting the material thickness, material, and cross-sectional shape of the cover 14 and the pad 10.

Additionally, the roof rail inner part 6 has formed in it deformable regions 12 at positions corresponding to the positions of the nuts 24 of the pad 10. For this reason, when the pad 10 is deformed, the ends of the bolts 23 which protrude toward the roof rail inner part 6 from the uppermost surface 33 of the pad 10 interfere with these deformable regions 12. When the bolts 23 interfere with and push against the deformable regions 12, the deformable regions 12 are pushed outward in the lateral (vehicle width) direction (to the inside of the roof rail 4), holes defined by the slits 11 are formed, and the ends of the bolts 23 enter the roof rail 4 from these holes. For this reason, the amount of deformation of the pad 10 increases, this representing an improvement in the absorption of the shock energy to which the head is subjected.

In addition, because the cover 14 is divided front-to-back, the shock energy absorption characteristics at the division point thereof (the part at which the front and rear covers 15 and 16 are linked) is not as good as at other parts. However, because the division point is in the region of the center pillar 2, at which there is the smallest chance of being contacted by the head of a passenger, it is possible to minimize the problem of having the cover 14 divided in this manner.

Instead of using bolts 23 and nuts 24 to fix the cover 14, it is possible to use rivets or the like, and instead of using a deformable region 12, it is possible to form holes in the roof rail inner part 6 through which the ends of the bolts 23 can be inserted.

Figure 3:
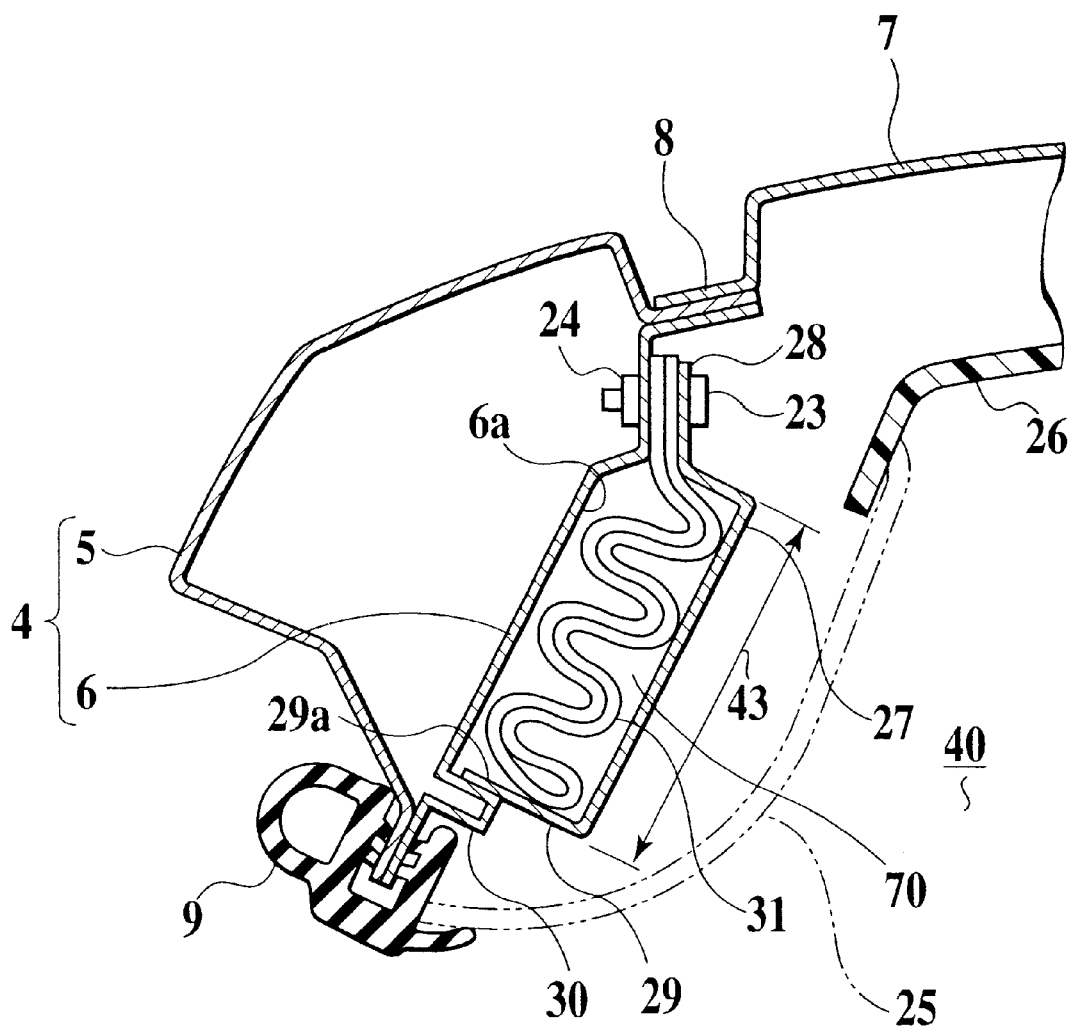
FIG. 3 is a cross-section view of the second embodiment of the present invention.

FIG. 3 is a cross-section view showing the second embodiment of the present invention. Elements of this embodiment that correspond to elements of the first embodiment are assigned the same reference numerals and will not be explicitly described herein.

In the second embodiment, the pad 10 is not provided, padding being provided by a cover 27 only (by deformation of the material thereof).

In this embodiment, a metal cover 27 having a substantially U-shaped cross-section that is opposite to and matches the U-shaped inner surface 6a of the roof rail inner part 6 is formed over the surface 6a. Mounting tabs 28 are formed at a prescribed interval on the cover 27, these mounting tabs 28 being tightened to the roof rail inner part 6 by bolts 23 and nuts 24. Because there is only a cover 27 and no pad over the surface 6a, compared to the case of the first embodiment, in which there is a pad 10 and a cover 14, there is a larger deformation of the width 43 of the cover 27, the capacity thereof being large. For this reason, the air bag 31 in the space 70 between the roof rail inner part 6 and the cover 27 is folded up so as to overlap in the width 43 direction of the cover 27.

The lower end 29a of the lower wall 29 of the cover 27 is in proximity to the roof rail inner part 6. A protrusion 30 protruding toward the inside of the passenger compartment 40 is formed in the lower end of the roof rail inner part 6, the lower end 29a of the lower wall 29 engaging with this protrusion 30.

When the air bag 31 expands because of a side collision, the cover 27 is pushed upward, so that end 29a of the lower wall 29 moves away from the protrusion 30, the cover 27 opening up about the mounting tabs 28 as a hinge, the result being that the end 29a moves away from the roof rail inner part 6, thereby forming an aperture (not shown in the drawing) between the lower wall 29 and the roof rail inner part 6, through which the air bag 31 deploys downward.

Because the cover 27 being pushed upward causes the end 29a of the lower wall 29 to move upward and away from the protrusion 30, the protrusion 30 does not interfere with the opening of the cover 27.

In the case in which a side collision is not strong enough to cause the deployment of the air bag 31, the head of the passenger comes into contact with the cover 27, which deforms, thereby absorbing the shock energy of the head. When this occurs, the downward opening movement of the lower wall 29 of the cover 27 is prevented by the protrusion 30. For this reason, the cover 27 tends not to deform, so that there is an increase in the amount of absorbed shock energy, this representing an improvement in the protection afforded the head of the passenger. Other elements of this embodiment are the same as described with regard to the first embodiment.

Figure 4:
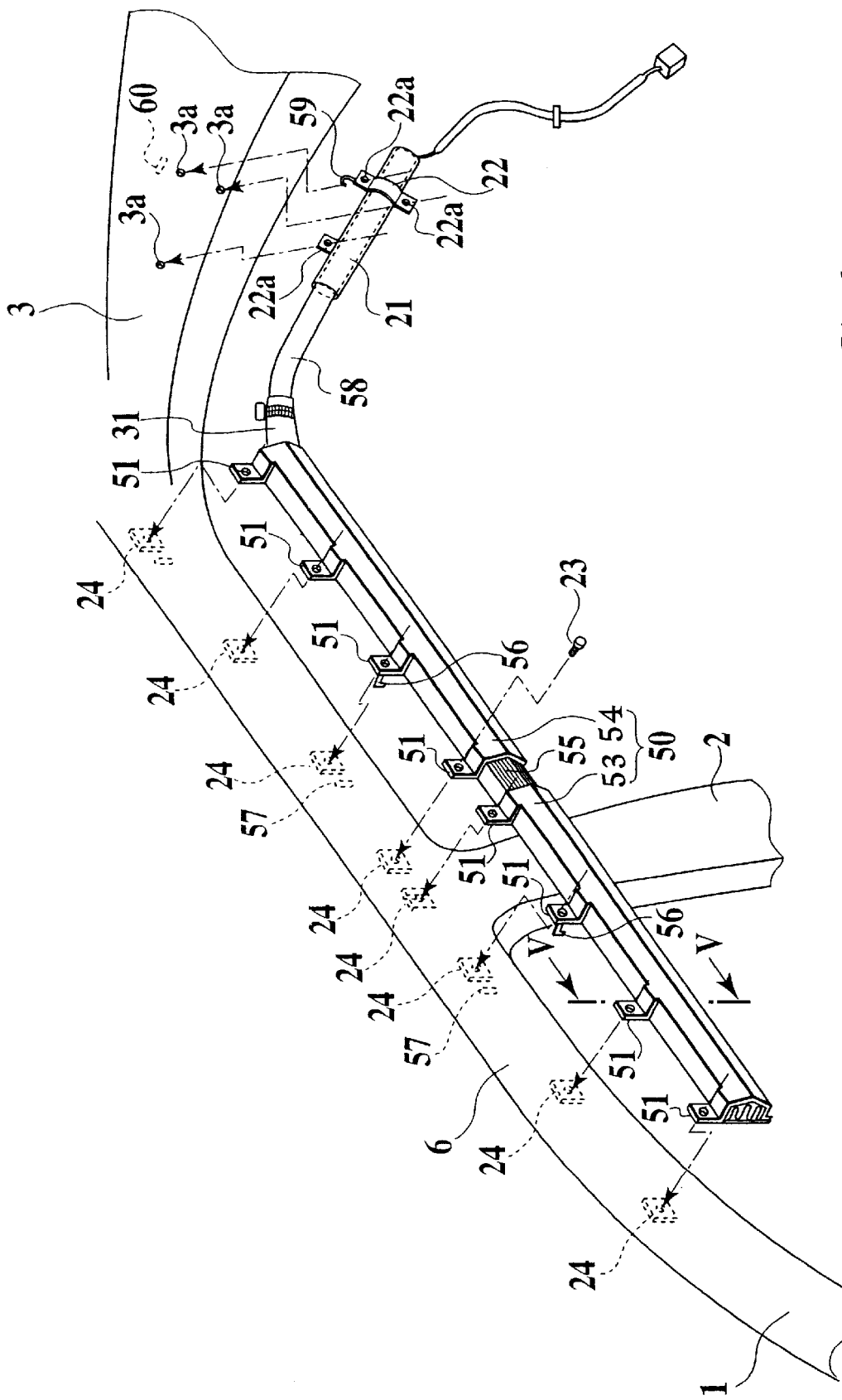
FIG. 4 is an exploded perspective view of the third embodiment of the present invention.
Figure 5:
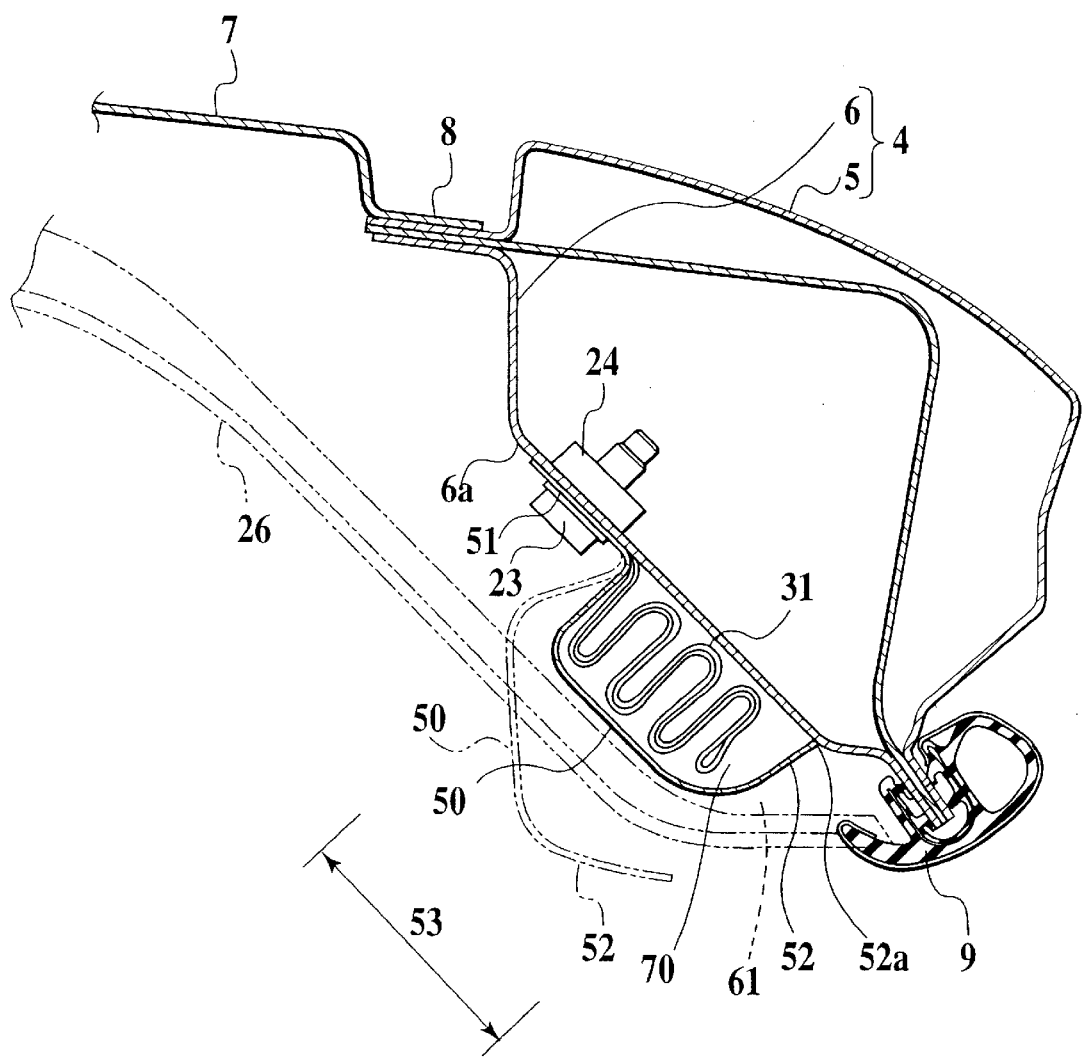
FIG. 5 is a cross-section view in the direction of the arrows V—V of FIG. 4.

FIG. 4 is a perspective view of the third embodiment of the present invention, and FIG. 5 is a cross-section view along the cutting line V—V of FIG. 4. Elements of the third embodiment that correspond to elements in the first and second embodiments are assigned the same reference numerals and will not be explicitly described herein.

In the third embodiment, a pad 10 is not provided, only a cover 50, such as in the second embodiment, being used to provide padding (by the deformation of the material thereof). The third embodiment differs from the second embodiment in that the protrusion 30 is not provided on the roof rail inner part 6.

In this embodiment, a metal cover 50 having a substantially U-shaped cross-section is attached to inner surface 6a of the roof rail inner part 6. Mounting tabs 51 are formed at a prescribed interval on the cover 50, these mounting tabs 51 being tightened to the roof rail inner part 6 by bolts 23 and nuts 24. The air bag 31 in the space 70 between the roof rail inner part 6 and the cover 50 is folded up so as to overlap in the width 53 direction of the cover 50.

The lower end 52a of the lower wall 52 of the cover 50 is in proximity to the roof rail inner part 6. While the lower wall 52 of the cover 50 is not fixed to the roof rail inner part 6, the rigidity of the cover 50 itself maintains its proximity to the roof rail inner part 6.

The cover 50 is formed by a front cover 53 and a rear cover 54, the rear end of the front cover 53 and the front end of the rear cover 54 being joined by a connector 55 in the region near the top of the center pillar 2. The front and rear covers 53 and 54 are both provided with provisional holding hooks 56, and holes 57, into which these hooks 56 latch, are provided in the roof rail inner part 6. The bolts 23 and the nuts 24 catch the hooks 56 in the holes 57, thereby tightening the cover 50 in a provisionally held condition to the roof rail inner part 6.

The rear end of the air bag 31 and the inflator 21 are joined by a pipe 58. The inflator 21 is provided with a hook 59 for provisionally holding it, and a hole 60, into which this hook 59 is caught, is provided on the rear pillar 3.

When the air bag 31 inflates because of a side collision, the cover 50 is pushed upward, so as to open about the mounting tabs 51 as hinges, the end 52a thereby moving away from the roof rail inner part 6, so that an aperture 61 is formed between the lower wall 52 and the roof rail inner part 6, the air bag 31 deploying downward from this aperture 61.

In the case in which the side collision is not strong enough to cause the air bag 31 to deploy, the head of the passenger comes into contact with the cover 50, which deforms, thereby absorbing the shock energy of the head. Other elements of this embodiment are the same as described with regard to the first and second embodiments.

What is claimed is:

1. In a vehicle, an air bag apparatus comprising:
    an energy-absorbing member extending longitudinally, the member fixed onto an inner surface of a roof rail and having a cross-section that is substantially hat-shaped protruding into a passenger compartment of the vehicle;
    a longitudinal metal cover disposed below the energy-absorbing member on the inner surface of the roof rail, the cover having an upper end and a lower end, the upper end fixed to an uppermost surface of the energy-absorbing member, the lower end disposed in proximity to the roof rail, and the roof rail and the cover defining an inner space; and
    an air bag folded up and housed in the inner space, wherein, when the air bag is inflated upon the occurrence of a collision of the vehicle, the air bag presses the cover toward the compartment, the lower end of the cover moves away from the roof rail, an aperture is formed between the roof rail and the lower end of the cover, and the air bag expands downward through the aperture.

2. An air bag apparatus according to claim 1, wherein shock energy absorption characteristics of the energy-absorbing member are substantially the same as shock energy absorption characteristics of the cover.

3. An air bag apparatus according to claim 1 further comprising a fixing member, wherein the fixing member fixes the cover to the uppermost surface, and wherein the roof rail includes an intrusion-allowing part disposed in opposition to the fixing member for allowing intrusion into the roof rail of the fixing member.

4. An air bag apparatus according to claim 3, wherein the intrusion-allowing part is a deformable part allowing the fixing member to intrude into the roof rail when the energy-absorbing member is deformed so as to apply pressure to the roof rail.

5. An air bag apparatus according to claim 4, wherein the deformable part is defined by a slit formed in the roof rail, and wherein when the fixing member presses the deformable part, the deformable part deforms so as to allow the intrusion of the fixing member.

6. An air bag apparatus according to claim 1, wherein the energy-absorbing member is made of a metal.

7. An air bag apparatus according to claim 1 further comprising an engaging part on an inner surface of the roof rail for engaging with the lower end of the cover, wherein the inflated air bag removes the lower end from the engaging part and causes the cover to rotate about the upper end as a center.

8. An air bag apparatus according to claim 1, wherein the cover comprises a front cover portion and a rear cover portion, a rear end of the front cover portion and a front end of the rear cover portion being linked together.

9. An air bag apparatus according to claim 8, wherein the rear end of the front cover portion and the front end of the rear cover portion are linked near a center pillar.

10. An air bag apparatus according to claim 8, wherein the rear end of the front cover portion has a mounting tab extending from the upper end thereof, the front end of the rear cover portion has a mounting tab extending from the upper end thereof, and the mounting tabs mutually overlap and are fixed to the roof rail.

11. An air bag apparatus according to claim 1, wherein the cover has mounting tabs disposed so as to be longitudinally separated from one another, extending from the upper end thereof, the mounting tabs being fixed to the roof rail and disposed at a prescribed interval that limits a flexure of the cover when the air bag deploys to within a prescribed limit.

12. An air bag apparatus according to claim 1, wherein the roof rail comprises a roof rail inner part and a roof rail outer part.

13. A vehicle comprising:
    a longitudinal metal cover disposed on an inner surface of a roof rail of the vehicle, the cover having an upper end fixed to the roof rail, a lower end of the cover extending toward the roof rail, and the roof rail and the cover defining an inner space; and
    an air bag folded up and housed in the inner space, wherein an inner surface of the roof rail has a protrusion which is integrally formed with the roof rail and disposed below the lower end of the cover;
    wherein the protrusion is in contact with the lower end of the cover when the air bag is not inflated; and
    wherein, when the air bag is inflated upon the occurrence of a collision of the vehicle, the air bag presses the cover toward a passenger compartment of the vehicle so that the lower end of the cover moves away from the roof rail, thereby forming an aperture between the roof rail and the lower end of the cover so that the air bag may expand downward through the aperture.

14. In a vehicle, an air bag apparatus comprising:
    a longitudinal metal cover disposed on an inner surface of a roof rail, the cover having an upper end fixed to the roof rail and a lower end extending toward the roof rail, and the roof rail and the cover defining an inner space; and
    an air bag folded up and housed in the inner space, wherein, when the air bag is inflated upon the occurrence of a collision of the vehicle, the air bag presses the cover toward a passenger compartment of the vehicle, the lower end of the cover moves away from the roof rail, an aperture is formed between the roof rail and the lower end of the cover, and the air bag expands downward through the aperture, and
    wherein the cover comprises a front cover portion and a rear cover portion, a rear end of the front cover portion and a front end of the rear cover portion being linked together.

15. An air bag apparatus according to claim 14, wherein the rear end of the front cover portion and the front end of the rear cover portion are linked near a center pillar.

16. An air bag apparatus according to claim 14, wherein the rear end of the front cover portion has a mounting tab extending from the upper end thereof, the front end of the rear cover portion has a mounting tab extending from the upper end thereof, and the mounting tabs mutually overlap and are fixed to the roof rail.

17. In a vehicle, an air bag apparatus comprising:
    a longitudinal metal cover disposed on an inner surface of a roof rail, the cover having an upper end fixed to the roof rail and a lower end extending toward the roof rail, and the roof rail and the cover defining an inner space; and
    an air bag folded up and housed in the inner space, wherein, when the air bag is inflated upon the occurrence of a collision of the vehicle, the air bag presses the cover toward a passenger compartment of the vehicle, the lower end of the cover moves away from the roof rail, an aperture is formed between the roof rail and the lower end of the cover, and the air bag expands downward through the aperture, and wherein the cover has mounting tabs disposed so as to be longitudinally separated from one another, extending from the upper end thereof, the mounting tabs being fixed to the roof rail and disposed at a prescribed interval that limits a flexure of the cover when the air bag deploys to within a prescribed limit.

* * * * *